May 21, 1968 R. P. SHAH 3,384,796
STRIP BREAK CONTROL TO STOP DRIVE MOTORS
Filed May 6, 1965
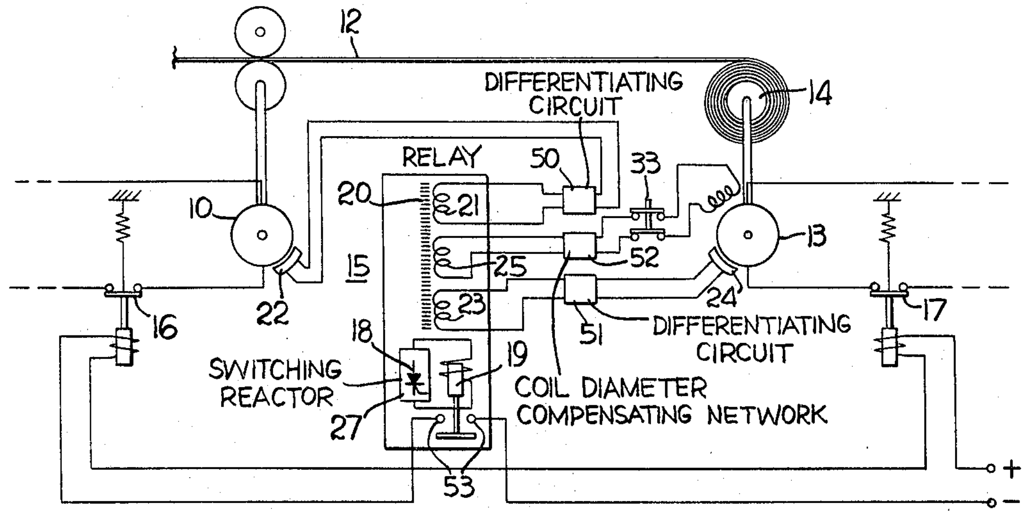
Fig. 1
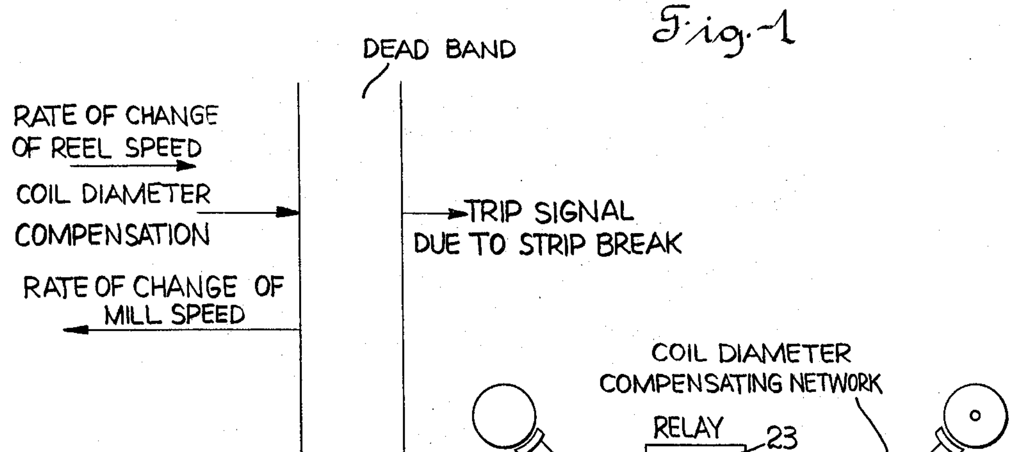
Fig. 3
Fig. 2
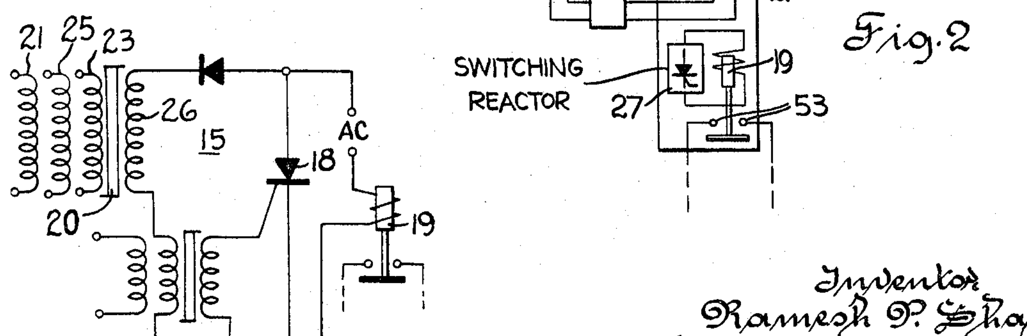
Fig. 4
Inventor
Ramesh P. Shah
By Robert B. Benson
Attorney United States Patent Office 3,384,796
Patented May 21, 1968

3,384,796
STRIP BREAK CONTROL TO STOP DRIVE MOTORS

Ramesh P. Shah, Milwaukee, Wis., assignor to Allis-Chalmers Manufacturing Company, Milwaukee, Wis.

Filed May 6, 1965, Ser. No. 453,748
4 Claims. (Cl. 318—7)

ABSTRACT OF THE DISCLOSURE

A control for stopping the drive motor of a rolling mill in the event of a break in the rolled strip comprises a magnetic amplifier relay with multiple input windings on a square loop core, first tachometer means coupled to one input winding of the relay for deriving a signal which is a measure of the rate of change of speed of the mill drive motor, second tachometer means coupled to a second input winding of the relay for deriving a signal which is a measure of the rate of change of speed of the reel motor, means coupled to a third input winding of the relay for deriving a signal which is a function of the build-up of strip material on the reel, and means coupled to the output winding of the relay and responsive to a predetermined unbalance between the signals to the relay input windings and including a silicon control rectifier for disconnecting the drive motors from the source of power if the strip being rolled breaks.

This invention relates generally to rolling mills such as multistand metal rolling mills for producing thin strips of metal. More specifically, this invention relates to a control means for instantaneously and automatically stopping the driving motors of such a mill in the event that the strip being rolled breaks.

In the past the strip breaks on a strip mill were detected by the use of a tensionometer or photoelectric cell. The tensionometer is a very expensive device and it is uneconomical to use such a device unless it is also being used for tension regulation in connection with the rolling of the strip. Difficulty has been encountered in the use of photoelectric cells because the light source is sometimes covered by the metal dust and chips from the rolling operation, which does not give reliable operation. Furthermore, a great deal of maintenance is needed in connection with this type of device. Other devices have been used such as contact limit switches and proximity limit switches, but these also have drawbacks in that the contact type switch mars the metal strips being rolled, whereas the proximity limit switch has to be closely controlled and may be affected by the magnetic characteristics of the strip material.

This invention provides a simple control device which takes a measure of the rate of change of speed of the stand drive motor and a measure of the rate of change of speed of either reel motor as compensated by the coil diameter changes and compares the signals algebraically. If these signals are not balanced in the relay which receives them the relay produces a signal which actuates a switch and takes the motors off the line. This invention is particularly useful because it automatically compensates for the rate of change of speed of the drive and reel motors during the acceleration and deceleration period.

Therefore, it is the object of this invention to provide a new and improved strip break control for a rolling mill.

Another object of this invention is to provide a strip break control device for a rolling mill which utilizes a signal which measures the rate of change of speed between either reel motor and the stand drive motor.

Another object of this invention is to provide a new and improved strip break control for a rolling mill which is simple, inexpensive and easy to maintain, and yet reliable and fast enough to prevent damage to the mill.

Other objects and advantages of this invention will be apparent from the following description when read in connection with the accompanied drawings, in which:

FIG. 1 is a simple schematic drawing of the control circuit in connection with a rolling mill to illustrate the operation of the device;

FIG. 2 is an alternate embodiment illustrating a modified compensating means for reel diameter changes;

FIG. 3 is a line graph illustrating rhetorically the way the signals to the relay balance each other; and FIG. 4 is a schematic circuit diagram of the relay which algebraically sums the control signals.

Referring more particularly to the drawings by characters of reference, the control system is illustrated in connection with a stand drive motor 10 rolling a strip 12 of metal and a reel motor 13 operatively connected to a take-up reel 14. Both of these motors are adapted to be connected to an appropriate source of electric power (not shown). A control scheme for a take-up reel is described here. The control scheme for unwinding reels is similar electrically except various control signals in the relay have to be balanced in a different manner. Hence, the control scheme for the unwinding reels will be obvious to one skilled in the art once the control system for the take-up reel is understood.

An appropriate relay 15 is provided for receiving signals from the motors and in turn providing a signal which will actuate switches 16 and 17 to remove motors 10 and 13 from the power line. The relay 15 used in this control is a low level, adjustable relay which uses a high gain switching reactor which in turn fires a silicon controlled rectifier 18. The silicon controlled rectifier then energizes a conventional magnetic relay such as the solenoid 19. The relay 15, as schematically illustrated in FIG. 1, has a magnetic core 20 on which are wound three windings 21, 23, 25 for receiving signals from the motors and a fourth coil 26 that energizes a switching reactor 27. The switching reactor energizes solenoid 19 to close a DC circuit to actuate switches 16 and 17 and remove motors 10 and 13 from the power line. Relay 15 may be of the well known type having a magnetic amplifier with multiple input windings on a square loop core shown schematically in FIG. 4 such as that sold by Magnetics, Inc. under the mark Micro Sentry or that disclosed in U.S. Patent 3,242,413 to Hardies or that disclosed on page 53 of General Electric Silicon Control Rectifier Manual, Third edition (1964).

The first control winding 21 is connected to a tachometer 22 positioned adjacent the drive motor 10 through a differentiating circuit 50 which produces a control signal in proportion to the rate of change of speed of the stand drive motor. The second control winding 23 is connected to a tachometer 24 positioned adjacent to the reel motor 13 through a differentiating circuit 51 which produces a control signal in proportion to the rate of change of speed of the reel motor. The control signal in the control winding 23 acts in a manner to oppose the control signal derived in the control winding 21. The third control winding 25 is connected to receive a measure of coil diameter through the current in the shunt field winding of the reel motor 13. This shunt field current is related to the amount of strip material that has been wound up on the reel because of the relationship that exists between r.p.m. of the DC and the shunt field current of the reel motor. This then compensates for the different rate of change of speed of the reel motor due to different coil size for the same linear speed of the strip 12 being rolled. Hence, the control signal to coil 25 acts in a manner to add to the control signal of winding 23 and to oppose the control signal of winding 21.

The coil compensating signal required for coil 25 is nonlinear in nature and hence, the signal from the shunt field current is shaped through the shaping network 52 before it is fed to the control winding 25. This control signal is only required during acceleration and deceleration of the mill and taken out of the control circuit during normal operation by switch 33.

The control signals which are applied to the control windings 21, 23 and 25 are summed up algebraically in the relay. If these control signals are unbalanced, low level adjustable relay 15 is energized depending upon where the operating point is set. The unbalance control signal should be of sufficient magnitude to reach a predetermined minimum value before energizing the switching reactor 27. This could be referred to as a dead band area in which a slight amount of unbalance between the sum of the control signals in coils 21, 23, 25 will not be sufficient to energize the reactor so as to cause the motors 10, 13 to be taken off the line. However, once this unbalance of the sum of the control signals becomes large enough to energize the reactor 27, the solenoid 19 is energized to close the contact 53 and close the DC circuit to trip the switches 16 and 17 and thereby remove the motors 10, 13 off the line.

In operation, as the mill is started there is some rate of change of mill speed control signal in the control winding 21. The magnitude of this signal is directly proportional to the rate of acceleration. The rate of change of reel speed control signal in the control winding 23 depends upon the size of the coil on the reel. The signal in the control winding 25 supplements the signal of the control winding 23 depending upon the coil buildup on the reel. As the mill reaches its selected operating speed, the signal from the rate of change of speed of the stand drive motor disappears. The signal from the rate of change of speed of the reel continues as the coil is built up but is very small as compared to the signal during acceleration of the mill. Hence, no compensation due to coil buildup is necessary. Therefore, this portion 52 of the control can be cut out during the normal operation by disconnect switch 33.

If there is a break in the strip, the reel motor will immediately accelerate rapidly due to the release of tension between the stand and the reel which was caused by the strip extending therebetween. On the other hand, the speed of the stand motor will not change significantly. The rapid change of speed of the reel motor will produce an appreciable signal in the control winding 23 but there will be no significant signal to the winding 21. This large unbalance in the signals to relay 15 will energize the switching reactor and close the contact 53 which in turn trips out the switches 16 and 17 to remove the motors off the line.

If the mill is decelerated, the rate of change of speed signal of the stand motor is reversed in the control winding 21. The rate of change of speed signal of the reel motor is reversed too in the control winding 23. The coil buildup compensation signal is again brought into the circuit by means of switch 33 but is reversed so as to again add the signal of the control winding 23. Thereby the control signal of the control winding 21 derived from the rate of change of stand drive motor 10 always balances the signal of the control winding 23 derived from the rate of change of reel motors together with the signal of the coil diameter compensation control winding 25.

The same type of control system can be used for unwinding reel motors by changing the polarities of the various signals in the relay. Since this control system can be used for the winding and unwinding reel, it is easily adaptable to the reversing strip mills.

In the alternate embodiment illustrated in FIG. 2, the speed signal from reel tachometer 24 is recalibrated according to the coil size and has a single output signal. This recalibration of the tachometer signal can be accomplished by using one of the rheostat rings on a counter EMF rheostat which is stepped according to the coil compensation required. The counter EMF rheostat is a common tool used in the control field to regulate voltage. In this embodiment there are only two control windings 21, 23 on the relay 15. However, the relay operation is substantially identical because the signals in the control windings 21, 23 oppose each other and any substantial deviation between the signals fed to these windings due to a marked difference in the rate of change of speed of the reel motor and the stand motor will cause the relay 15 to operate the switching reactor. Then relay contact 53 again closes and actuates the switches 16, 17 to remove the motors 10, 13 off the line.

FIG. 3 is an illustration of how the signals in the control windings oppose each other and add up algebraically to produce a net signal. If the algebraic sum is greater than zero but of small magnitude it falls within the dead band range and the relay 15 does not operate to energize the switching reactor which controls the switches 16 and 17. However, if the magnitude of the algebraic sum of the signals becomes great enough it will provide a sufficient signal to operate the switching reactor and open the switches to take the motors 10 and 13 off the line.

Although but two embodiments of this invention have been illustrated and described, it will be apparent to those skilled in the art that various modifications and changes can be made herein without departing from the spirit of the invention or the scope of the appended claims.

The embodiments of the invention in which an exclusive property or privilege is claimed are defined as follows:

1. A control for a rolling mill having a drive motor and a reel motor energized from a source of electric power comprising:

a relay having first, second and third windings on a magnetic core, said first and second windings being wound so as to algebraically sum signals thereto to produce a signal in said third winding when said algebraic sum exceeds a predetermined value;

means coupled to said first winding for deriving a signal which is a function of the rate of change of the speed of said drive motor;

means coupled to said second winding for deriving a signal which is a function of the rate of change of the speed of said reel motor, said second winding being wound on said core to oppose the flux induced in said core by said first winding;

a silicon controlled rectifier;

switch means operable in response to firing of said silicon controlled rectifier for disconnecting said motors from said source of power; and means coupled to said third winding responsive to a predetermined electrical unbalance between said first and second windings for firing said silicon controlled rectifier.

2. A control for a rolling mill having a drive motor and a reel motor energized from a source of electric power comprising:

a relay having first, second and third control windings and a fourth winding on a magnetic core, said windings being wound so as to algebraically sum signals to said control windings to produce a signal in said fourth winding when said algebraic sum exceeds a predetermined value;

means coupled to said first control winding for deriving a signal which is a function of the rate of change of the speed of said drive motor;

means coupled to said second control winding for deriving a signal which is a function of the rate of change of the speed of said reel motor, said second control winding being wound on said core to oppose the flux induced in said core by said first control winding;

means coupled to said third control winding for deriving a signal which is a function of the buildup of strip material on the reel driven by said reel motor, said third control winding being wound on said magnetic core to complement said signal in said second control winding; and means including a reactor coupled to said fourth winding responsive to electrical unbalance between said control windings for disconnecting said motors from said source of power when said unbalance reaches a predetermined magnitude.

3. A control for a rolling mill having a drive motor and a reel motor energized from a source of electric power comprising:

a relay having first, second and third control windings and a fourth winding on a magnetic core, said control windings being wound so as to algebraically sum signals to said control windings to produce a signal in said fourth winding when said algebraic sum exceeds a predetermined value;

means coupled to said first control winding and including a tachometer positioned adjacent said drive motor for deriving a signal which is a measure of the rate of change of the speed of said drive motor;

means coupled to said second control winding and including a tachometer positioned adjacent said reel motor for deriving a signal which is a measure of the rate of change of the speed of said reel motor, said second control winding being wound on said core to oppose the flux induced in said core by said first control winding;

said reel motor having a field winding, the current in said field winding being related to the amount of strip material wound on the reel driven by said reel motor;

means coupled to said third control winding for deriving a signal which is a function of the current of the field winding on said reel motor, said third control winding being wound on said core to complement said signal in said second control winding and compensate for the buildup of strip material on the reel driven by said reel motor; and means coupled to said fourth winding and being responsive to electrical unbalance between said control windings for disconnecting said motors from said source of power when said unbalance reaches a predetermined magnitude.

4. A control for a rolling mill having a drive motor and a reel motor energized from a source of electrical power comprising:

a relay having first, second and third control windings and a fourth winding on a magnetic core, said control windings being wound so as to algebraically sum signals to said control windings to produce a signal in said fourth winding when said algebraic sum exceeds a predetermined value;

means coupled to said first control winding and including a first tachometer positioned adjacent said drive motor for deriving a signal which is a function of the rate of change of the speed of said drive motor;

means coupled to said second control winding and including a second tachometer positioned adjacent said reel motor for deriving a signal which is a function of the rate of change of the speed of said reel motor, said second control winding being wound on said core to oppose the flux induced in said core by said first control winding;

said reel motor having a field winding, the current in said field winding being related to the amount of strip material wound on the reel driven by said reel motor;

means coupled to said third control winding for deriving a signal which is a function of the current in said field winding, said third control winding being wound on said core to complement said signal in said second control winding and compensate for the buildup of strip material on the reel driven by said reel motor;

a DC circuit including a pair of solenoid control switches normally connecting said motors to said source; and means coupled to said fourth winding and being responsive to a predetermined magnitude of the signal produced therein resulting from unbalance between said control windings for closing said DC circuit to operate said solenoid control switches and disconnect said motors from said source.

References Cited

UNITED STATES PATENTS

| | | | |
|---|---|---|---|
| 2,543,622 | 2/1951 | Edwards et al. | 318—52 |
| 2,858,493 | 10/1958 | Hull et al. | 318—458 X |

ORIS L. RADER, *Primary Examiner.*

B. A. COOPER, *Assistant Examiner.*